(12) United States Patent
Gheorghiu et al.

(10) Patent No.: US 11,751,179 B2
(45) Date of Patent: Sep. 5, 2023

(54) OPTIMIZATION OF CARRIER AGGREGATION CAPABILITIES FOR SUPPORT OF DIFFERENT BANDS DEFINED IN THE SAME FREQUENCY RANGE

(71) Applicant: QUALCOMM Incorporated, San Diego, CA (US)

(72) Inventors: Valentin Alexandru Gheorghiu, Yokohama (JP); Alexei Yurievitch Gorokhov, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 16/838,877

(22) Filed: Apr. 2, 2020

(65) Prior Publication Data
US 2020/0322954 A1    Oct. 8, 2020

Related U.S. Application Data

(60) Provisional application No. 62/829,353, filed on Apr. 4, 2019.

(51) Int. Cl.
*H04W 72/04* (2023.01)
*H04W 72/0453* (2023.01)

(52) U.S. Cl.
CPC ............. *H04W 72/0453* (2013.01)

(58) Field of Classification Search
None
See application file for complete search history.

(56) References Cited

U.S. PATENT DOCUMENTS

| 2012/0202487 | A1* | 8/2012  | Kazmi    | H04W 72/042 |
|              |     |         |          | 455/432.1   |
| 2017/0367073 | A1* | 12/2017 | Murugan  | H04B 1/0053 |
| 2018/0219652 | A1  | 8/2018  | Chen et al. | |
| 2019/0281604 | A1* | 9/2019  | Kim      | H04W 72/0453 |
| 2019/0306925 | A1* | 10/2019 | Iskander | H04L 5/0094 |
| 2020/0022036 | A1* | 1/2020  | Lee      | H04W 72/0413 |
| 2020/0045581 | A1* | 2/2020  | Dong     | H04W 88/16  |

OTHER PUBLICATIONS

International Search Report and Written Opinion—PCT/US2020/026533—ISAEPO—dated Jul. 31, 2020 (192153WO).
(Continued)

*Primary Examiner* — Saba Tsegaye
(74) *Attorney, Agent, or Firm* — Norton Rose Fulbright US LLP

(57) ABSTRACT

Various designs for optimization of carrier aggregation (CA) capability signaling are discussed. A user equipment (UE) configured for CA determines to signal supported CA combinations that include a band, the band being one of a first band and a second band. The first band is a superset of the second band. The UE signals the supported CA combinations that include the band to the network. A base station receives a signal indicating the CA combinations supported by the UE that include the band. The base station determines CA combinations that include the first band and CA combinations that include the second band based on the CA combinations received from the UE.

30 Claims, 8 Drawing Sheets

(56) References Cited

OTHER PUBLICATIONS

Nokia Networks (Rapporteur): "Report of Email Discussion [91bis#10] [LTE/CAenh] UE Capabilities", 3GPP Draft, 3GPP TSG-RAN WG2 Meeting #92, R2-156477_91BIS#10 Report of E-Mail Discussion on Capability Signalling Enhancements, 3rd Generation Partnership Project (3GPP), Mobile Competence Centre, 650, Route Des Lucioles, F-0692, vol. RAN WG2, No. Anaheim, United States, Nov. 16, 2015-Nov. 20, 2015, Nov. 16, 2015 (Nov. 16, 2015), XP051005882, 33 Pages, Retrieved from the Internet: URL: http://www.3gpp.org/ftp/Meetings_3GPP_SYNC/RAN2/Docs/, [retrieved on Nov. 16, 2015], p. 10-p. 12.

NTT Docomo, et al., "Functional Modification of Retrieving Different UE Capabilities for a Fallback Band Combination", 3GPP Draft, 3GPP TSG-RAN WG2 Meeting #97, 36331_CR2660_(REL-14)_R2-1701841, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 13, 2017-Feb. 17, 2017, Feb. 12, 2017 (Feb. 12, 2017), XP051211420, 39 Pages, Retrieved from the Internet: URL: http://www.3gpp.org/ftp/Meetings_3GPP_SYNC/RAN2/Docs/, [retrieved on Feb. 12, 2017], p. 6-p. 8.

\* cited by examiner

OPTIMIZATION OF CARRIER AGGREGATION CAPABILITIES FOR SUPPORT OF DIFFERENT BANDS DEFINED IN THE SAME FREQUENCY RANGE

CROSS-REFERENCE TO RELATED APPLICATIONS

This application claims priority to co-pending U.S. Provisional Application No. 62/829,353, entitled "OPTIMIZATION OF CARRIER AGGREGATION CAPABILITIES FOR SUPPORT OF DIFFERENT BANDS DEFINED IN THE SAME FREQUENCY RANGE," filed Apr. 4, 2019, the disclosure of which is hereby incorporated herein by reference.

BACKGROUND

Field

Aspects of the present disclosure relate generally to wireless communication systems, and more particularly, to optimization of carrier aggregation (CA) capabilities for support of different bands defined in a same frequency range.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, at a UE capable of CA, to signal at least one CA combination supported by the UE, the at least one CA combination including a band, wherein the band is one of: a first band or a second band, wherein the first band is a superset of the second band, and signaling, by the UE, the at least one CA combination supported by the UE.

In an additional aspect of the disclosure, a method includes receiving, at a base station, from a UE, a signal indicating at least one CA combination supported by the UE, the at least one CA combination including a band, wherein the band is one of: a first band or a second band, and determining, by the base station, CA combinations including the first band and CA combinations including the second band supported by the UE based on the at least one CA combination.

In an additional aspect of the disclosure, an apparatus configured for wireless communication includes means for determining, at a UE capable of CA, to signal at least one CA combination supported by the UE, the at least one CA combination including a band, wherein the band is one of: a first band or a second band, wherein the first band is a superset of the second band, and means for signaling, by the UE, the at least one CA combination supported by the UE.

In an additional aspect of the disclosure, an apparatus configured for wireless communication includes means for receiving, at a base station, from a user equipment (UE), a signal indicating at least one CA combination supported by the UE, the at least one CA combination including a band, wherein the band is one of: a first band or a second band, and means for determining, by the base station, CA combinations including the first band and CA combinations including the second band supported by the UE based on the at least one CA combination.

In an additional aspect of the disclosure, a non-transitory computer-readable medium having program code recorded thereon. The program code including program code executable by a computer for causing the computer to determine, at a UE capable of CA, to signal at least one CA combination supported by the UE, the at least one CA combination including a band, wherein the band is one of: a first band or a second band, wherein the first band is a superset of the second band, and to signal, by the UE, the at least one CA combination supported by the UE.

In an additional aspect of the disclosure, a non-transitory computer-readable medium having program code recorded thereon. The program code including program code executable by a computer for causing the computer to receive, at a base station, from a UE, a signal indicating at least one CA combination supported by the UE, the at least one CA combination including a band, wherein the band is one of: a first band or a second band, and to determine, by the base station, CA combinations including the first band and CA combinations including the second band supported by the UE based on the at least one CA combination.

In an additional aspect of the disclosure, an apparatus configured for wireless communication is disclosed. The apparatus includes at least one processor, and a memory coupled to the processor. The processor is configured to determine, at UE capable of CA, to signal at least one CA combination supported by the UE, the at least one CA combination including a band, wherein the band is one of: a first band or a second band, wherein the first band is a superset of the second band, and to signal, by the UE, the at least one CA combination supported by the UE.

In an additional aspect of the disclosure, an apparatus configured for wireless communication is disclosed. The apparatus includes at least one processor, and a memory coupled to the processor. The processor is configured to receive, at a base station, from a UE, a signal indicating at least one CA combination supported by the UE, the at least one CA combination including a band, wherein the band is one of: a first band or a second band, and to determine, by the base station, CA combinations including the first band and CA combinations including the second band supported by the UE based on the at least one CA combination.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
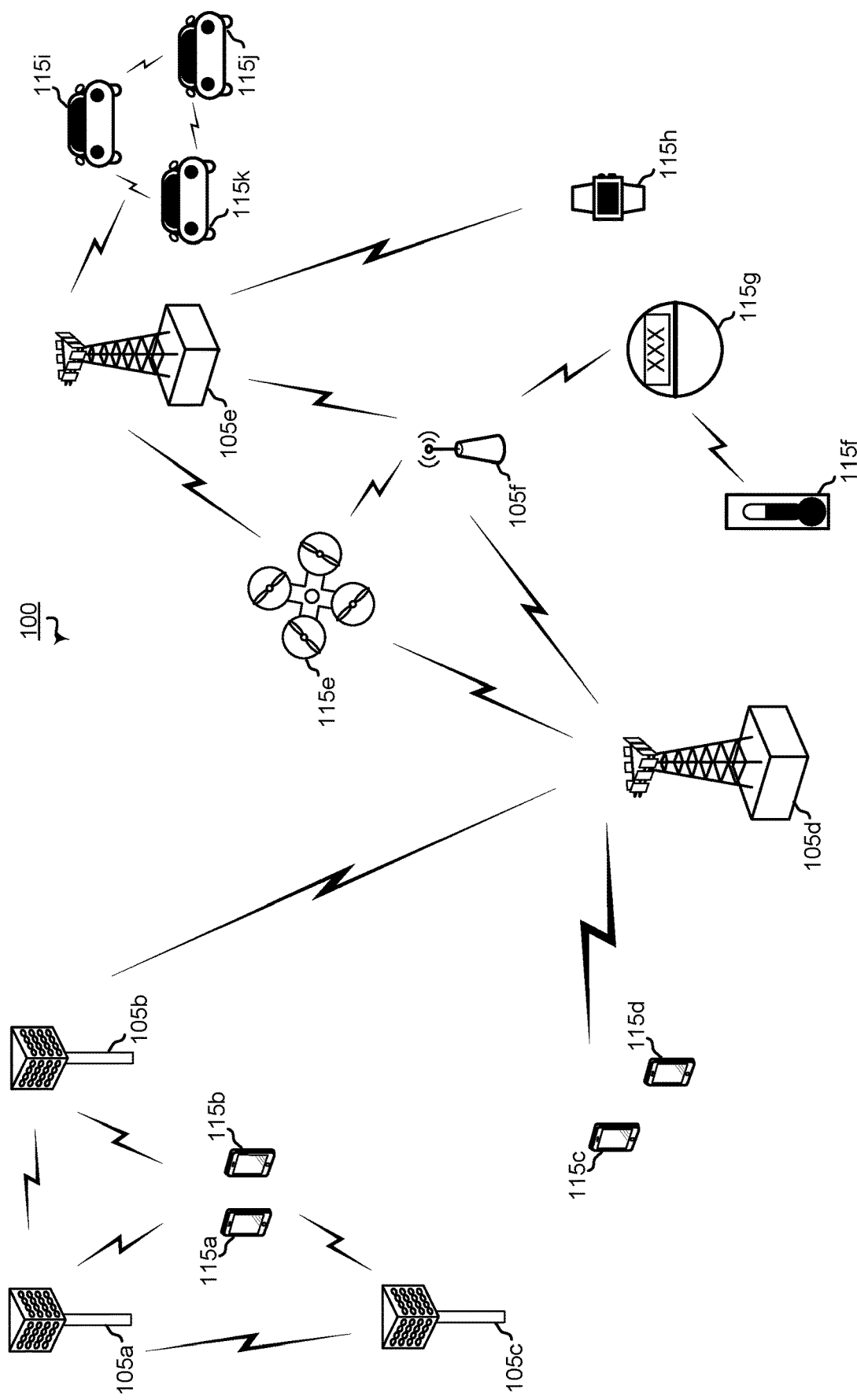
FIG. 1 is a block diagram illustrating details of a wireless communication system.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS)

mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as interne of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
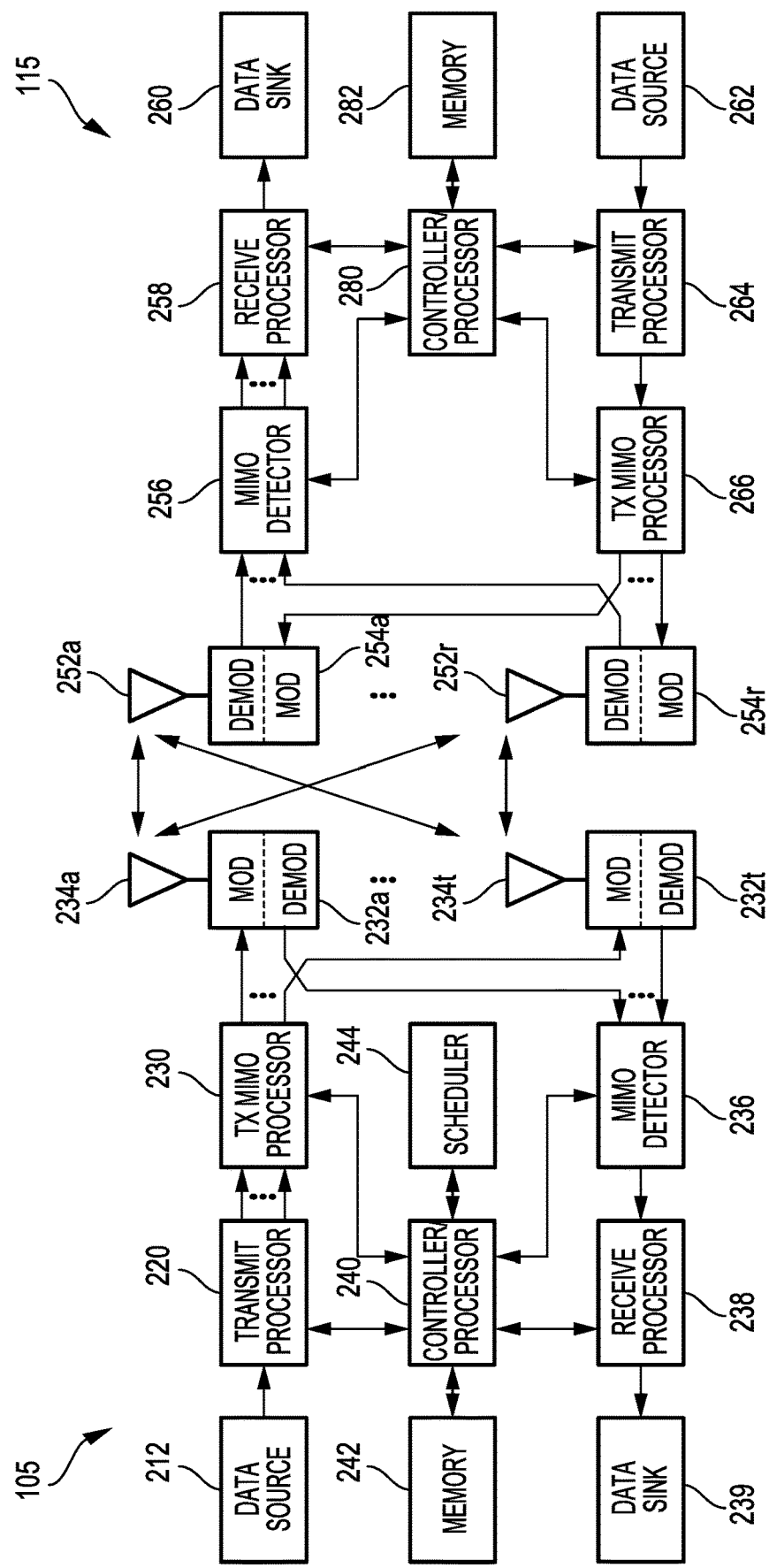
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In wireless communication implementations, CA may be used to increase the bandwidth of wireless communications, as user terminals may transmit data over multiple component carriers. These component carriers may be associated with particular operating bands of the wireless communication spectrum. Network entities supporting CA, may support various combinations of CA, such as intra-band, and/or inter-band CA. In particular, a UE may support thousands of CA combinations (e.g., operating band combinations). In existing implementations, every CA combination supported by a UE is reported by the UE. Moreover, for each CA combination, the UE also signals the capabilities supported for the bands in the CA combination, separately for each CA combination. For example, for a particular CA combination, the UE may signal features (e.g., configurations, limitations, etc.) supported for each band of the supported CA combination. Additionally, in some implementations, it may be possible to define multiple bands within the same frequency range, or as a superset of other bands. As used herein, a superset of a particular band may refer to a band that includes, within its bandwidth, the particular band (e.g., the band includes a wider frequency range than the particular band) or may refer to a band with tighter RF requirements.

In another case, new operating bands may be defined (e.g., adding a new operating band to the communication spectrum, or reconfiguring/rearranging the existing operating bands to define a new operating band). In this case, CA capabilities with respect to the new bands, including each CA combination that includes the new band, and every feature supported by the new band in the new CA combinations, is to be signaled, thereby further increasing the CA capability signaling size.

As will be appreciated, a UE supporting CA may have to signal large amounts of information, which may lead to messages of a very large size, in the order of megabytes in some cases, in order to properly signal the UEs CA capability. Because of this, CA capability signaling is very difficult to manage in existing systems.

Various aspects of the present disclosure are directed to providing a mechanism for optimization of CA capability signaling. Such CA capability signaling optimization may facilitate support of different bands defined within the same frequency range, or defined as supersets of other bands.

Figure 5:
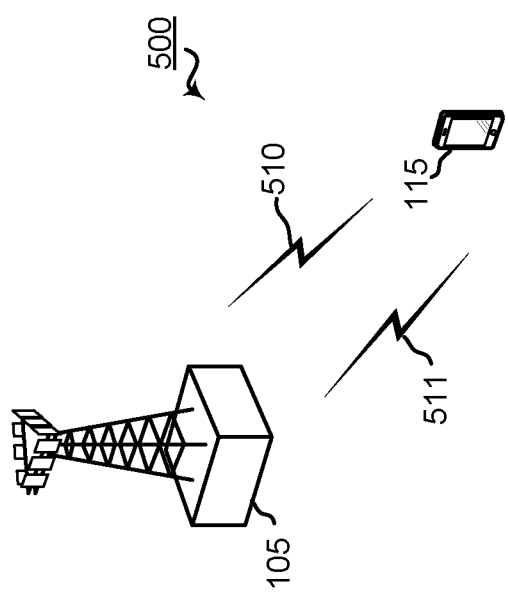
FIG. 5 is a block diagram illustrating an example network configured for CA capability signaling optimization operations according to aspects of the present disclosure.

FIG. 5 shows a diagram illustrating wireless communication system 500, configured in accordance with aspects of the present disclosure. In particular, wireless communication system 500 may include UE 115, configured to support CA. As noted above, UE 115 may be configured to support inter-band and intra-band CA combinations. The CA combinations supported by UE 115 may include CA combinations that include first band 510, and may also include CA combinations that include second band 511. In aspects, first band 510 may be a superset of second band 511. In this case, as noted above, first band 510 may include a wider frequency range than second band 511, and second band 511 may fall within the bandwidth of first band 510. Additionally, or alternatively, first band 510 may have tighter RF requirements than second band 511. Furthermore, first band 510 may support features and/or may have additional requirements that are not supported and/or required by second band 511. For example, a combination using second band 511 may require that 2×2 MIMO be used, whereas a combination using first band 510 may require that 4×4 MIMO be used. In this case, the 4×4 MIMO requirement may also cover the 2×2 MIMO requirement and thus, first band 510 may support additional features than second band 511.

In aspects, it may be determined that, based on first band 510 being a superset of second band 511, UE 115's support of at least one CA combination that includes first band 510 may indicate that UE 115 may also support the same CA combination including second band 511. For example, UE 115 may support a CA combination A that includes first band 510 and another band. In this case, it may be determined, e.g., by UE 115, that UE 115 may support a CA combination A' that includes second band 511 and another band.

It is noted that in existing systems, UE 115 would signal CA capabilities for all supported CA combination, which would include CA combinations including first band 510, and CA combinations including second band 511. As such, in existing systems, UE 115 CA capability signaling would be duplicated, which may lead to a huge signaling overhead. In addition, such CA capability signaling duplication may also result in a cumbersome 3GPP standards-specification management, as all CA combinations are duplicated for a band (e.g., second band 511) and for the superset band (e.g., first band 510).

It is also noted that although the discussion above, and the discussion that follows, focuses on operations with respect to two operating bands, operations with respect more than two bands is also envisioned and applicable. Indeed, the functionality of UEs and base stations discussed herein with respect to CA capability signaling optimization, may be implemented with respect to every operating band supported by a UE and/or base station. For example, a UE may support CA combinations that include a first band that is a superset of more than one other band. In this case, the functionality described herein may also be applicable to derive UE support for combinations that include the more than one other band. Therefore, the description of operations of two bands is merely for illustrative purposes and should not be construed as limiting in any way.

Various aspects of the present disclosure are directed to providing a mechanism for reporting to a network (e.g., network entities within a wireless communication system, such as base stations, relay nodes, access points, etc.), CA combinations (e.g., band combinations) including particular bands. In aspects, the reporting may include signaling only the CA combinations that include either one of a particular band or a superset of that band. For example, in the example illustrated in FIG. 5 UE 115 may signal only CA combinations that include either first band 510 or second band 511. In aspects, a network entity receiving the signaling may determine all CA combination supported by the UE including the first and second bands based on the signaled CA combinations. For example, base station 105 may determine all CA combination supported by UE 115 that include first band 510 and all CA combinations that include second band 511 based on the signaled CA combinations (for either first band 510 or second band 511).

Figure 3:
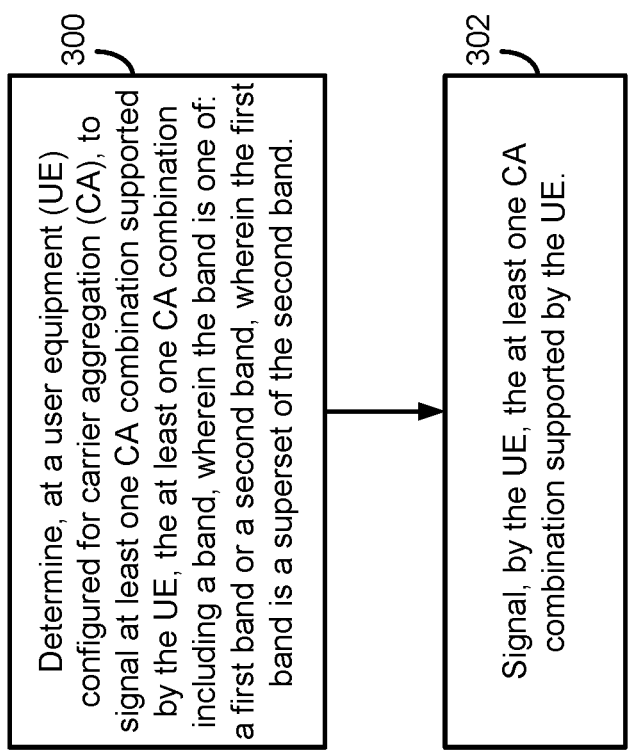
FIG. 3 is a block diagram illustrating example blocks executed to implement aspects of the present disclosure.
Figure 4:
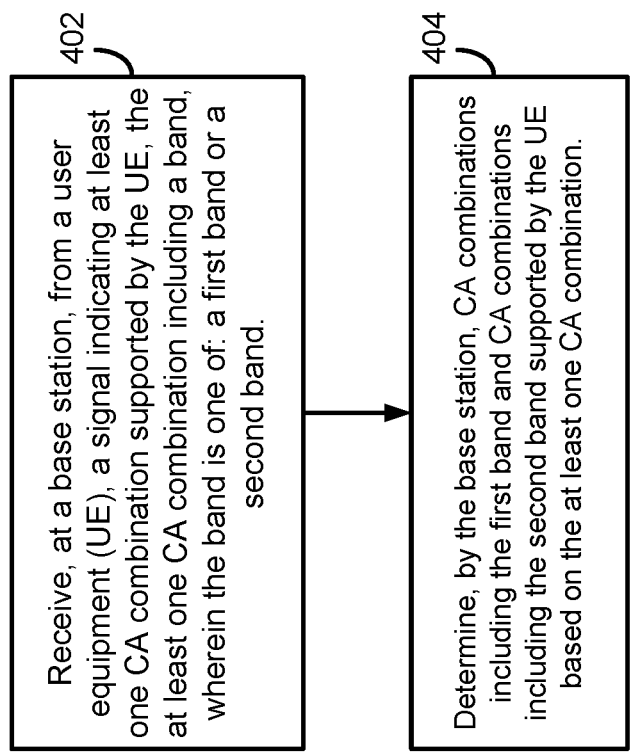
FIG. 4 is a block diagram illustrating example blocks executed to implement aspects of the present disclosure.

FIGS. 3 and 4 are block diagrams illustrating example blocks executed by a UE and a base station to implement aspects of the present disclosure. The example blocks will also be described with respect to gNB 105 as illustrated in FIG. 7, and with respect to UE 115 as illustrated in FIG. 8.

Figure 7:
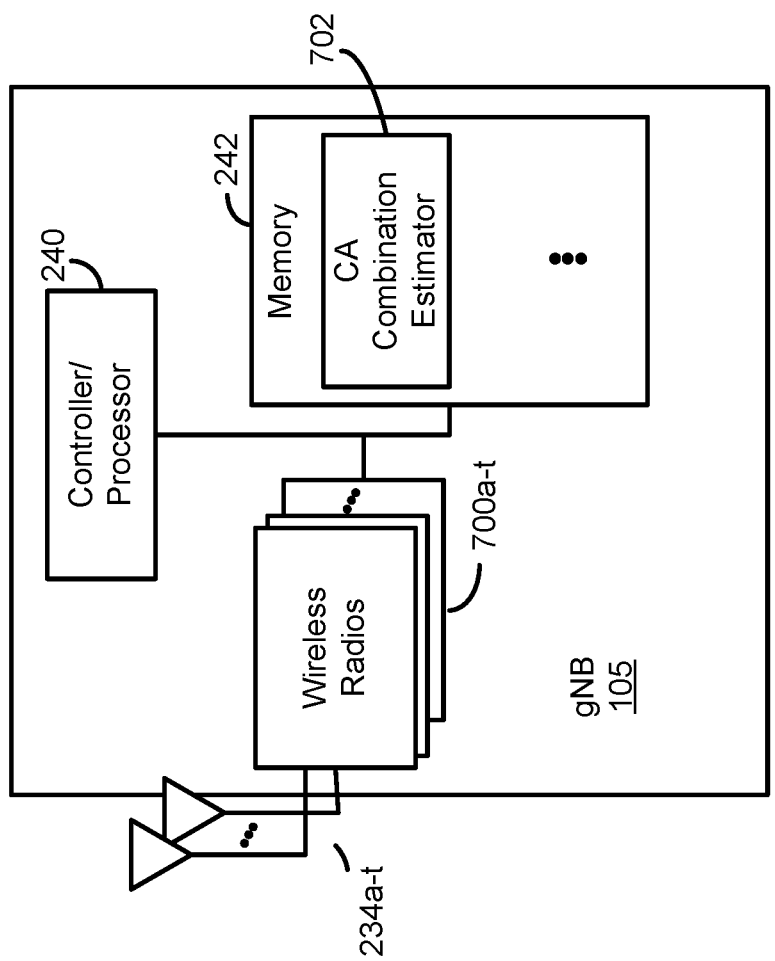
FIG. 7 is a block diagram illustrating a user equipment configured according to one aspect of the present disclosure.

FIG. 7 is a block diagram illustrating gNB 105 configured according to one aspect of the present disclosure. gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 700a-t and antennas 234a-t. Wireless radios 700a-t includes various components and hardware, as illustrated in FIG. 2 for gNB 105, including modulator/demodulators 232a-t, MIMO detector 236, receive processor 238, transmit processor 220, and TX MIMO processor.

Figure 8:
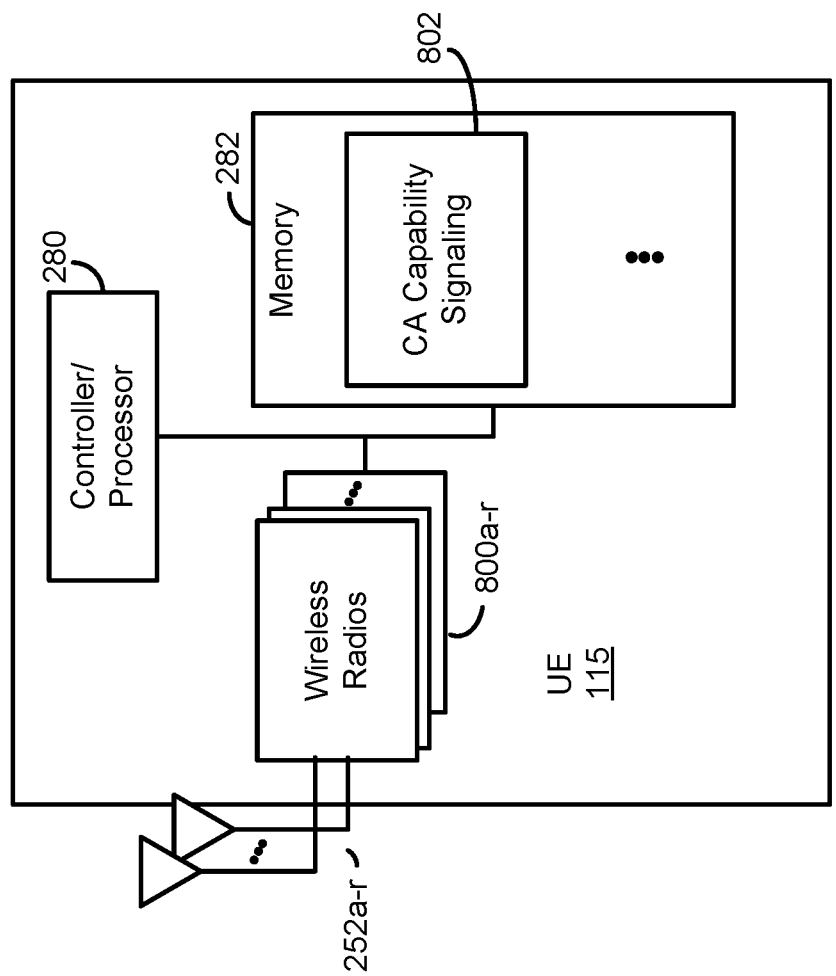
FIG. 8 is a block diagram illustrating a base station configured according to one aspect of the present disclosure.

FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 300, a UE configured for CA determines to signal at least one CA combination supported by the UE. For example, UE 115 may execute, under control of controller/processor 280, CA capability signaling 802, stored in memory 282. The execution environment of delay CA capability signaling 802 provides the procedural steps for determining, by the UE, to signal at least one CA combination supported by the UE. In aspects, the at least one CA combination determined to be signaled by the UE may include a CA combination including a band. The band whose combinations may be determined to be signaled may be either a band, such as second band 511, or may be the superset of the band, such as first band 511. In aspects, either the CA combinations that include first band 510 or the CA combinations that include second band 511 are determined to be signaled, but not both. Thus, for example, when UE determines to include in the at least one CA combination CA combinations that include the first band, the UE may exclude CA combinations that include the second band from the at least one CA combination. In that sense, first band 510 and second band 511 may be interchangeable in the signaled CA combination list reported to the network.

Figure 6:
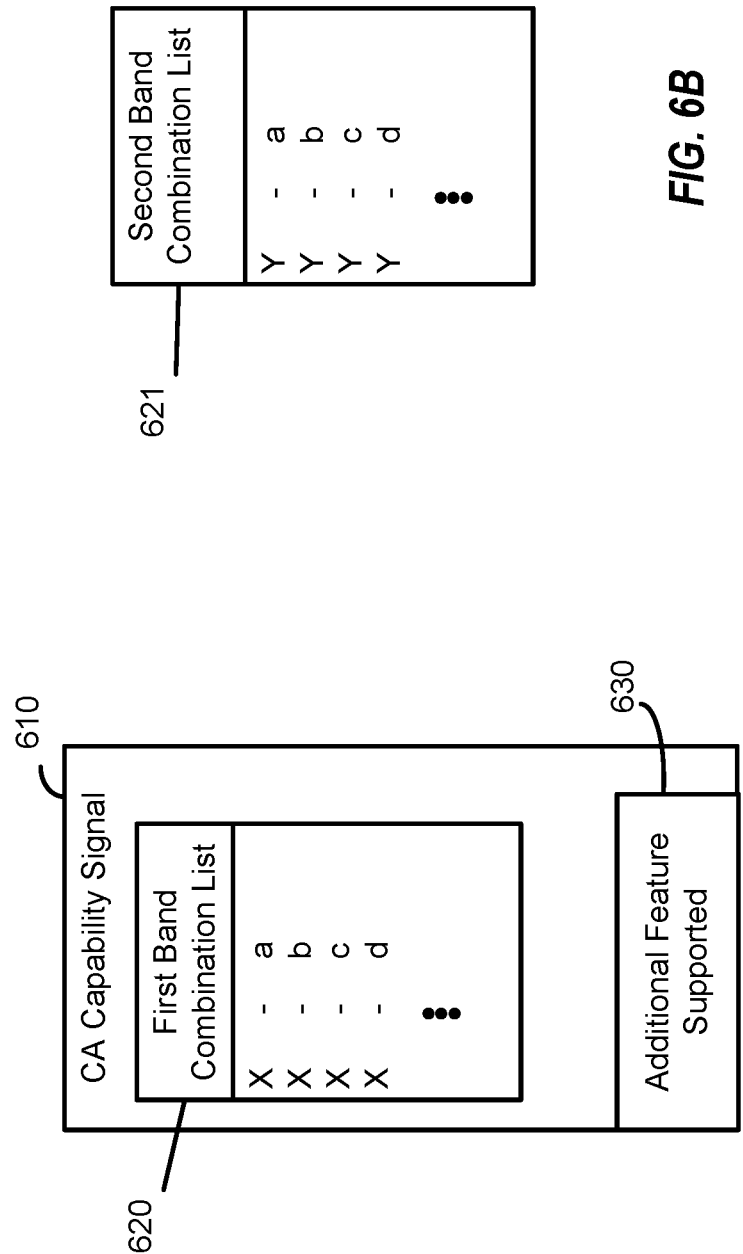
FIG. 6A shows a diagram illustrating an example of a CA capability signaling.
FIG. 6B shows a diagram illustrating an example of a CA combination list.

FIG. 6A shows a diagram illustrating an example of a CA capability signaling. In this example, CA capability signaling 610 includes a CA combination list 620 for CA combinations that include a particular band. In this case, the CA combinations signaled include CA combinations that include the first band (labeled X in this example). It will be appreciated, that in an alternate aspect, CA combination list 620 may instead include CA combinations for a second band for which the first band is a superset. In particular, UE 115 may support a combination of band X with band a, a combination of band X with B, a combination of band X with c, etc. As noted above, and as will be discussed in more detail below, UE may support band X and band Y, where band Y may be at least partially equal to band X (e.g., band X is a superset of band Y). In some aspects, band X may be at least partially equal to band Y, plus some additional features and/or requirements. In some aspects, the set of bands that a UE supports may be already known by the network.

At block 300, the UE signals the at least one CA combination supported by the UE. For example, UE 115, under control of processor 280, may transmit CA capability signaling 610 via antennas 252a-r and wireless radios 800a-r to network entities, such as gNB 105. With reference to FIG. 4, at block 402, a base station receives the signal indicating the at least one CA combination supported by the UE. For example, example, gNB 105, under control of controller/processor 240, receives signals via wireless radios 700a-t and antennas 234a-t. After decoding the signals, gNB 105 may determine the signal indicating the at least one CA combination supported by the UE.

At block 404, the base station, determines CA combinations that include the first band and CA combinations that include the second band based on the at least one CA combination. For example, gNB 105 may execute, under control of controller/processor 240, CA combination estimator 702, stored in memory 242. The execution environment of CA combination estimator 702 provides the procedural steps for determining, by gNB 105, CA combinations that include the first band and CA combinations that include the second band based on the at least one CA combination.

In aspects, the base station may determine CA that include the first band and CA combinations that include the second band based on the at least one CA combination by substituting the band in the reported at least one combination. For example, FIG. 6B shows a diagram illustrating an example of a CA combination list derived from a received CA combination list. In this example, gNB 105 may receive CA capability signaling 610, which may include CA combination list 620 that includes CA combinations that include the first band (labeled X in this example). In this case, gNB 105 may generate CA combination list 621 that lists CA combinations that include the second band (labeled Y in this example) by substituting the first band with the second band. gNB 105 performs the substitution based on determination that the first band (X) is a superset of the second band (Y). For example, as UE 115 supports a CA combination of the first band (X) with a band a, gNB 105 may determine that UE 115 may also support a combination of the second band (Y) with band a. The same process may applied to the combinations with b, c, d, etc., to generate a list of CA combinations that include CA combinations of the second band (Y), with each of b, c, d, etc. Similarly, although not shown in the Figures, UE 115 may signal CA combinations for the second band (Y) instead of the first band (X). In this case, gNB 105 may substitute the instances of the second band in the signaled CA combination list with the first band to generate a CA combination list that includes CA combinations including the first band. In this sense, the first and the second band may be made interchangeable in the CA combination list signaled by the UE. It is noted again that the assumption here is that the first is a superset of the second band.

In aspects, the substitution of the signaled band in the CA combination may be based on various approaches. For example, in aspects, UE 115 may signal support for CA combinations that include the first band (X), and may signal the list of CA combinations that include the first band (X)), including CA combinations of the first band (X) with at least one other band. UE 115 may also signal support for the second band (Y). In this case, gNB (and/or any other network entity receiving the signaling), may determine that UE also supports CA combinations that include Y, including CA combinations of the second band (X) with the at least one other band. In this case, the UE also support for CA combinations that include the second band (Y) may be derived from the signaled CA combinations that include the first band (X), and from the determination that the UE also supports the second band (Y) as a separate band.

In aspects, an interchangeability CA capability may be signaled. The interchangeability CA capability may indicate that the first band (X) and the second band (Y) may be interchangeable in the supported CA combinations. In this case, UE 115 may signal the CA combinations, and may also signal, e.g., in a message such as at least one bit, that the first band (X) may be substituted with the second band (Y), or that the second band (Y) may be substituted with the first band (X).

From the foregoing, it will be appreciated that signaling, by the UE, a single set of CA combinations (e.g., for either the first band or the second band), is sufficient for the base station to derive and determine the CA combinations supported by the UE including the first band and CA combinations including the second band.

In aspects, the at least one CA combination signaled by the UE explicitly excludes CA combinations for one of the bands. For example, when the UE determines to include CA combinations that include the second band in the at least one CA combination, the UE may exclude CA combinations that include the first band from the at least one CA combination signaled. Conversely, when the UE determines to include CA combinations that include the first band in the at least one CA combination, the UE may exclude CA combinations that include the second band from the at least one CA combination signaled. Again, this example assumes that the first band is a superset of the second band.

It will be appreciated, as noted above, that although the discussion herein focuses on a first and second band, the first band being a superset of the second band, this is done for illustrative purposes and not by way of limitation. As such, the functionality described herein is also applicable for instances where more than a single set of CA combinations is signaled by a UE. For example, a UE may signal CA combinations for a plurality of bands. In this example, each band in the plurality of band may be associated with a respective band (either by being a superset of the respective band, or by the respective band being a superset of the band). In this case, CA combinations for each of the respective bands may be determined by a base station based on the received plurality of CA combinations.

In aspects, CA combinations that include the first band may support a first set of features. The set of features supported in a particular CA combination may be specific to the first band, or to another band in the particular CA combination, or to a subset of the bands in the CA combination. For example, particular features (e.g., defined by some special UE capability) may be supported when the first band is used in a CA combination. Similarly, CA combinations that include the second band may support a second set of features. In this case, the first set may include at least one additional feature that is not included in the second features. In other words, the first band and the second band may be different in that the first band includes at least one additional supported feature. In aspects, as the first features set and the second feature set differ only by some additional features, a UE may signal support for CA combinations that include the second band, and may also signal support for the additional features. In this case, the network (e.g., gNB 105, and/or any other network entity) may determine that the UE also supports the same signaled CA combinations but with the first band, as described above. In some aspects, the additional feature(s) may be a mandatory feature for CA combinations that use the first band. In this case, the UE may not signal the additional features. Nonetheless, the base station may determine that the difference between the first band and the second band is the additional mandatory feature for the first band, and may still be able to derive the CA combinations for the first band, based on the signaled CA combinations for the second band and based on a determination that the difference between the first band and the second band is the mandatory feature.

In aspects, as noted above, the optimization features discussed herein may also facilitate simplification of the 3GPP and other relevant standards. For example, a condition may be included in applicable standards that any CA combination with a particular band is also defined as a CA combination for a second band, where the first band is a superset of the second band. In this case, the requirements for both bands may be defined as the same, thereby simplifying the standard definitions and requirements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3 and 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect may include determining, at a UE capable of CA, to signal at least one CA combination supported by the UE, the at least one CA combination including a band, wherein the band is one of: a first band or a second band, wherein the first band is a superset of the second band, and signaling, by the UE, the at least one CA combination supported by the UE.

A second aspect, based on the first aspect, further including determining, by the UE, to include in the at least one CA combination, CA combinations including one of the first band or the second band.

A third aspect, based on the second aspect, wherein when the UE determines to include in the at least one CA combination the CA combinations including the first band, excluding the CA combinations including the second band from the at least one CA combination, or when the UE determines to include in the at least one CA combination the CA combinations including the second band, excluding the CA combinations including the first band from the at least one CA combination.

A fourth aspect, based on the first aspect, wherein when the signaled at least one CA combination includes the first band combined with another band, the signaled at least one CA combination is used by a network entity to determine a CA combination including the second band combined with the other band, or when the signaled at least one CA combination includes the second band combined with the other band, the signaled at least one CA combination is used by the network entity to determine a CA combination including the first band combined with the other band.

A fifth aspect, based on the fourth aspect, further comprising: signaling an interchangeability CA capability that indicates that the first band and the second band are interchangeable in the at least one CA combination, and wherein the signaled at least one CA combination is used by a network entity to determine a CA combination including either the first band or the second band based on the interchangeability CA capability.

A sixth aspect, based on the fifth aspect, wherein the interchangeability CA capability is signaled in a bit of a message.

A seventh aspect, based on the first aspect, wherein the at least one CA combination includes all combinations including the band supported by the UE.

An eighth aspect, based on the first aspect, wherein a set of features supported in the CA combinations including the first band includes at least one additional feature than a set of features supported in the CA combinations including the second band, the set of features supported in the CA combinations including the first band being associated with the first band, or the set of features supported in the CA combinations including the second band being associated with the second band.

A ninth aspect, based on the eighth aspect, further including signaling, by the UE, the at least one additional feature along with the at least one CA combination.

A tenth aspect, based on the eighth aspect, wherein the at least one additional feature is a mandatory feature for the CA combinations including the first band, and wherein the at least one additional feature is excluded from the signaling of the at least one CA combination.

An eleventh aspect, based on the eighth aspect, wherein, when the signaled at least one CA combination includes the first band combined with another band, the signaled at least one CA combination is used by a network entity to determine at least one of a CA combination including the second band combined with the other band, or features supported in the CA combination including the second band combined with the other band.

A twelfth aspect may also include receiving, at a base station, from a UE, a signal indicating at least one CA combination supported by the UE, the at least one CA combination including a band, wherein the band is one of: a first band or a second band, and determining, by the base station, CA combinations including the first band and CA combinations including the second band supported by the UE based on the at least one CA combination.

A thirteenth aspect, based on the twelfth aspect, wherein the at least one CA combination includes the CA combinations including the first band, and excludes the CA combinations including the second band, or includes the CA combinations including the second band and excludes the CA combinations including the first band.

A fourteenth aspect, based on the twelfth aspect, wherein the first band is a superset of the second band, and wherein the determining the CA combinations including the first band and the CA combinations including the second band includes determining, when the at least one CA combination includes the first band combined with another band, a CA combination including the second band combined with the other band based on the at least one CA combination, or determining, when the signaled at least one CA combination includes the second band combined with the other band, a CA combination including the first band combined with the other band based on the at least one CA combination.

A fifteenth aspect, based on the twelfth aspect, wherein the at least one CA combination includes all combinations including the band supported by the UE.

A sixteenth aspect, based on the twelfth aspect, wherein a set of features supported in the CA combinations including the first band includes at least one additional feature than a set of features supported in the CA combinations including the second band, the set of features supported in the CA combinations including the first band being associated with the first band, and the set of features supported in the CA combinations including the second band being associated with the second band.

A seventeenth aspect, based on the sixteenth aspect, further comprising receiving, by the base station, the at least one additional feature along with the signal indicating the at least one CA combination.

An eighteenth aspect, based on the sixteenth aspect, wherein the at least one additional feature is a mandatory feature for the CA combinations including the first band, and wherein the at least one additional feature is excluded from the signaling of the at least one CA combination.

A nineteenth aspect, based on the eighteenth aspect, further including determining, by the base station, whether the at least one CA combination includes the first band combined with another band, based on the at least one CA combination and the at least one additional feature, at least one of a CA combination including the second band combined with the other band, or features supported in the CA combination including the second band combined with the other band.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   determining, at a user equipment (UE) capable of carrier aggregation (CA), to signal at least one CA combination supported by the UE, the at least one CA combination including a first band or a second band based on whether the first band is a first superset of the second band or the second band is a second superset of the first band;
   signaling, by the UE, an interchangeability CA capability that indicates that the first band and the second band are interchangeable in the at least one CA combination; and
   signaling, by the UE, the at least one CA combination supported by the UE.

2. The method of claim 1, further comprising:
   determining, by the UE, to include in the at least one CA combination, CA combinations including one of the first band or the second band.

3. The method of claim 2, wherein:
   in response to the first band being a first superset of the second band, determining, by the UE, to include, in the at least one CA combination, the CA combinations including the first band, excluding the CA combinations including the second band from the at least one CA combination; or
   in response to the second band being a second superset of the first band, determining, by the UE to include, in the at least one CA combination, the CA combinations including the second band, excluding the CA combinations including the first band from the at least one CA combination.

4. The method of claim 1, wherein:
   in response to the signaled at least one CA combination including the first band combined with another band, the signaled at least one CA combination is used by a network entity to determine a CA combination including the second band combined with the other band; or
   in response to the signaled at least one CA combination including the second band combined with the other band, the signaled at least one CA combination is used by the network entity to determine a CA combination including the first band combined with the other band.

5. The method of claim 4, wherein the signaled at least one CA combination is used by a network entity to determine a CA combination including either the first band or the second band based on the interchangeability CA capability.

6. The method of claim 5, wherein the interchangeability CA capability is signaled in a bit of a message.

7. The method of claim 1, wherein the at least one CA combination includes all combinations including the first band or the second band that is supported by the UE.

8. The method of claim 1, wherein a set of features supported in the at least one CA combination that includes the first band includes at least one additional feature than a set of features supported in the CA combinations including the second band, the set of features supported in the CA combinations including the first band being associated with the first band, and the set of features supported in the CA combinations including the second band being associated with the second band.

9. The method of claim 8, further comprising:
   signaling, by the UE, the at least one additional feature along with the at least one CA combination.

10. The method of claim 8, wherein the at least one additional feature is a mandatory feature for the CA combinations including the first band, and wherein the at least one additional feature is excluded from the signaling of the at least one CA combination.

11. The method of claim 8, wherein, in response to the signaled at least one CA combination including the first band combined with another band, the signaled at least one CA combination is used by a network entity to determine at least one of:
    a CA combination including the second band combined with the other band; or
    features supported in the CA combination including the second band combined with the other band.

12. A method of wireless communication performed by a base station, the method comprising:
    receiving from a user equipment (UE), a first signal indicating at least one carrier aggregation (CA) combination supported by the UE, the at least one CA combination including a first band or a second band based on whether the first band is a first superset of the second band or the second band is a second superset of the first band;
    receiving, from the UE, a second signal indicating an interchangeability CA capability that indicates that the first band and the second band are interchangeable in the at least one CA combination; and
    determining, by the base station, CA combinations including the first band and CA combinations including the second band supported by the UE based on the at least one CA combination.

13. The method of claim 12, wherein the at least one CA combination:
    includes the CA combinations including the first band and excludes the CA combinations including the second band in response to the first band being a first superset of the second band; or
    includes the CA combinations including the second band and excludes the CA combinations including the first band in response to the second band being a second superset of the first band.

14. The method of claim 12, wherein the determining the CA combinations including the first band and the CA combinations including the second band includes:
    determining, in response to the at least one CA combination including the first band combined with another band, a CA combination that includes the second band combined with the other band based on the at least one CA combination; or
    determining, in response to the signaled at least one CA combination including the second band combined with the other band, a CA combination that includes the first band combined with the other band based on the at least one CA combination.

15. The method of claim 12, wherein the at least one CA combination includes all combinations including the first band or the second band that is supported by the UE.

16. The method of claim 12, wherein a set of features supported in the CA combinations including the first band includes at least one additional feature than a set of features supported in the CA combinations including the second band, the set of features supported in the CA combinations including the first band being associated with the first band, and the set of features supported in the CA combinations including the second band being associated with the second band.

17. The method of claim 16, further comprising:
receiving, by the base station, the at least one additional feature along with the first signal indicating the at least one CA combination.

18. The method of claim 16, wherein the at least one additional feature is a mandatory feature for the CA combinations including the first band, and wherein the at least one additional feature is excluded from the first signal indicating the at least one CA combination.

19. The method of claim 18, further comprising:
determining, by the base station, whether the at least one CA combination includes the first band combined with another band, based on the at least one CA combination and the at least one additional feature, at least one of:
a CA combination including the second band combined with the other band; or
features supported in the CA combination including the second band combined with the other band.

20. An apparatus, capable of carrier aggregation (CA), configured for wireless communication, the apparatus comprising:
at least one processor; and
a memory coupled to the at least one processor,
wherein the at least one processor is configured to:
determine to signal at least one CA combination supported by the apparatus, the at least one CA combination including a first band or a second band based on whether the first band is a first superset of the second band or the second band is a second superset of the first band;
signal an interchangeability CA capability that indicates that the first band and the second band are interchangeable in the at least one CA combination and
signal the at least one CA combination supported by the apparatus.

21. The apparatus of claim 20, further comprising configuration of the at least one processor to:
determine to include in the at least one CA combination, CA combinations including one of the first band in response to the first band being a first superset of the second band or the second band in response to the second band being a second superset of the first band.

22. The apparatus of claim 21, wherein the configuration of the at least one processor includes configuration of the at least one processor to:
in response to the first band being a first superset of the second band determine to include, in the at least one CA combination, the CA combinations that include the first band and that exclude the CA combinations including the second band from the at least one CA combination; or
in response to the second band being a second superset of the first band, determine to include, in the at least one CA combination, the CA combinations that include the second band and that exclude the CA combinations that include the first band from the at least one CA combination.

23. The apparatus of claim 22, wherein:
in response to the signaled at least one CA combination including the first band combined with another band, the signaled at least one CA combination is used by a network entity to determine a CA combination including the second band combined with the other band; or
in response to the signaled at least one CA combination including the second band combined with the other band, the signaled at least one CA combination is used by the network entity to determine a CA combination including the first band combined with the other band.

24. The apparatus of claim 23, wherein the signaled at least one CA combination is used by the network entity to determine a CA combination including either the first band or the second band based on the interchangeability CA capability.

25. The apparatus of claim 22, wherein a set of features supported in the CA combinations including the first band includes at least one additional feature than a set of features supported in the CA combinations including the second band, the set of features supported in the CA combinations including the first band being associated with the first band, and the set of features supported in the CA combinations including the second band being associated with the second band.

26. The apparatus of claim 25,
wherein the at least one additional feature is a mandatory feature for the CA combinations including the first band, and wherein the at least one additional feature is excluded from the signal indicating the at least one CA combination, and
in response to the signaled at least one CA combination including the first band combined with another band, the signaled at least one CA combination is used by a network entity to determine at least one of:
a CA combination including the second band combined with the other band; or
features supported in the CA combination including the second band combined with the other band.

27. An apparatus configured for wireless communication, the apparatus comprising:
at least one processor; and
a memory coupled to the at least one processor,
wherein the at least one processor is configured to:
receive, from a user equipment (UE), a first signal indicating at least one carrier aggregation (CA) combination supported by the UE, the at least one CA combination including a first band or a second band based on whether the first band is a first superset of the second band or the second band is a second superset of the first band; and
receive, from the UE, a second signal indicating an interchangeability CA capability that indicates that the first band and the second band are interchangeable in the at least one CA combination
determine CA combinations including the first band and CA combinations including the second band supported by the UE based on the at least one CA combination.

28. The apparatus of claim 27, wherein the at least one CA combination:
includes the CA combinations including the first band, and excludes the CA combinations including the second band in response to the first band being a first superset of the second band; or
includes the CA combinations including the second band and excludes the CA combinations including the first band in response to the second band being a second superset of the first band.

29. The apparatus of claim 27, wherein the configuration of the at least one processor to determine the CA combinations including the first band and the CA combinations including the second band includes configuration of the at least one processor to:
determine, in response to the at least one CA combination including the first band combined with another band, a CA combination that includes the second band combined with the other band based on the at least one CA combination; or determine, in response to the signaled at least one CA combination that includes the second band combined with the other band, a CA combination that includes the first band combined with the other band based on the at least one CA combination.

30. The apparatus of claim 27, further comprising configuration of the at least one processor to:
determine whether the at least one CA combination includes the first band combined with another band, based on the at least one CA combination and at least one additional feature, including at least one of:
a CA combination including the second band combined with the other band; or
features supported in the CA combination including the second band combined with the other band,
wherein a set of features supported in the CA combinations including the first band includes the at least one additional feature than a set of features supported in the CA combinations including the second band, the set of features supported in the CA combinations including the first band being associated with the first band, and the set of features supported in the CA combinations including the second band being associated with the second band.

* * * * *